(No Model.)

J. H. HOWARD.
PLUNGE BATTERY.

No. 473,463. Patented Apr. 26, 1892.

Attest:
Geo. T. Smallwood,
O. S. Bartlett.

Inventor:
James H. Howard
by
Knight Brothers Crosby
attys.

UNITED STATES PATENT OFFICE.

JAMES H. HOWARD, OF MEDFORD, MASSACHUSETTS.

PLUNGE-BATTERY.

SPECIFICATION forming part of Letters Patent No. 473,463, dated April 26, 1892.

Application filed December 1, 1890. Serial No. 373,274. (No model.)

*To all whom it may concern:*

Be it known that I, JAMES H. HOWARD, of Medford, in the county of Middlesex and State of Massachusetts, have invented certain new and useful Improvements in Plunge-Batteries, of which the following is a specification.

This invention relates to plunge-batteries, or those in which means are provided for raising and lowering the zinc and carbon elements to enable them to be removed wholly or partially from the solutions when the battery is to be made inoperative or when the strength of the current is to be diminished. Heretofore one way of operating these plates has been by means of pulleys or like contrivances supported over the plates and cords or chains connecting said pulleys with the plates.

My invention has for its object to provide simpler and less bulky means for operating the plates than those heretofore used; and to this end it consists in the construction and combination of parts, as hereinafter described and claimed.

Figure 1:
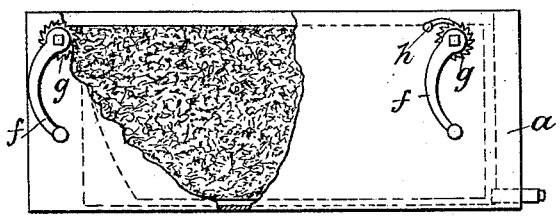
Figure 2:
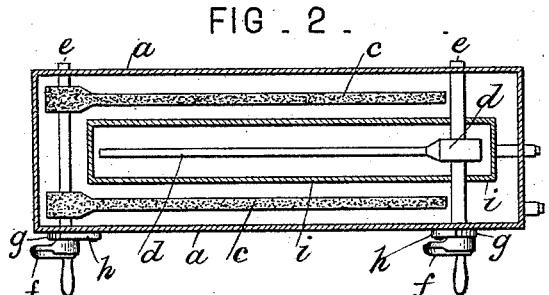

Of the accompanying drawings, forming a part of this specification, Figure 1 represents a side elevation of a battery embodying my invention, a part of the outer casing being broken away. Fig. 2 represents a top view of the same. Figs. 3, 4, 5, and 6 represent top views of different arrangements.

The same letters of reference indicate the same parts in all of the figures.

In the drawings, $a$ represents the outer box or case of a plunge-battery, and $c$ $d$ represent, respectively, the carbon and zinc plates thereof. In carrying out my invention I secure said plates to shafts or rods $e$, which are mounted in bearings in the case $a$ and are adapted to turn therein and by such movement to swing the plate or plates upwardly or downwardly, as the case may be. Said shafts project outside of the case $a$ and each is preferably provided with an operating-crank $f$ and with a ratchet $g$, with which a dog $h$, pivoted to the case $a$, may be engaged to hold the shaft with the plate or plates thereto attached at any desired elevation, as will be readily understood. For example, if it is desirable to partially but not wholly remove the plates from the solution with which they co-operate, the shaft may be turned until its plate or plates stand at an angle of forty-five degrees, more or less. When the shaft is turned so that its plate or plates stand vertically, said plates are entirely removed from the solution. The plates may be held in either of said positions by the engagement of the dog $h$ with the ratchet $g$.

In Figs. 1 and 2 I have shown two carbon plates attached to one shaft journaled near one end of the case and one zinc plate on another shaft journaled near the opposite end of the casing, the zinc plate being contained in a porous cell $i$ within the case $a$.

Figure 3:
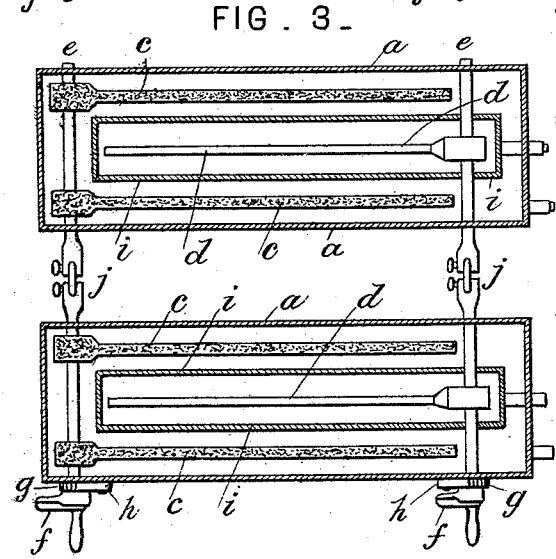

In Fig. 3 I have shown two batteries, like that shown in Fig. 2, the shafts being connected by couplings $j$ of non-conducting material, so that the plates of the two batteries may be operated simultaneously.

Figure 4:
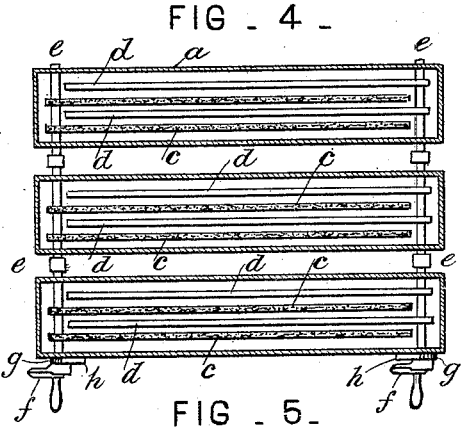

In Fig. 4 I have shown three batteries having their shafts coupled together. In this case there are two zinc plates on one shaft and two carbon plates on the other, and the porous cell is omitted.

Figure 5:
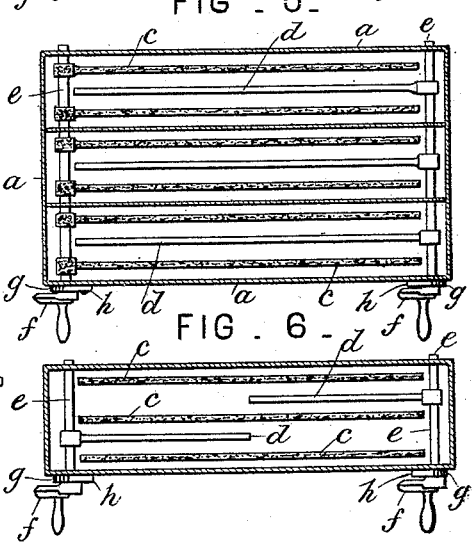

In Fig. 5 the inclosing case is subdivided into three compartments, each having two carbon plates and one zinc plate, all the carbon plates being attached to one shaft and all the zinc plates to another.

Figure 6:
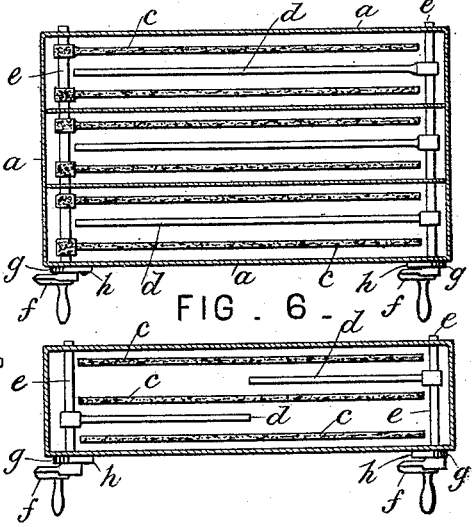

In Fig. 6 the carbon plates are shown as fixed and the zinc plates attached to two shafts.

It will be observed that in all cases the movable plates may be raised and lowered by a swinging movement in the arc of a circle and that the bulk of the battery is not materially increased by the devices for raising and lowering the plates.

It is obvious that the carbon plates, as shown in Figs. 2 to 5, may be arranged close to the sides of the box or case, forming a lining thereto, with the same effect as in the arrangement shown.

As shown in Figs. 1 to 6, the carbon and zinc plates are of a size nearly equal to the length and depth of the box or case, and when lowered therein are in a horizontal position and the axis of rotary motion thereof is at an upper corner of the plate and case. By this construction a rectangular box may receive plates of a size practically as large as though vertically movable therein.

I claim—

1. In a plunge-battery, the combination of the casing, the shafts journaled in the casing near opposite ends thereof, and the carbon and zinc plates attached, respectively, to said shafts, as set forth.

2. In a battery, the combination of a plurality of casings, each having shafts journaled therein near its opposite ends, carbon and zinc plates attached, respectively, to said shafts, and connections extending from the shafts of one casing to those of the next casing in line therewith, substantially as described.

3. In a battery, the combination of the casing, the shafts journaled in the casing near opposite ends thereof, carbon and zinc plates attached to said shafts, and means for holding the plates at any desired point of elevation, substantially as set forth.

In testimony whereof I have signed my name to this specification, in the presence of two subscribing witnesses, this 1st day of November, A. D. 1890.

JAMES H. HOWARD.

Witnesses:
C. F. BROWN,
A. D. HARRISON.